July 15, 1947.                L. W. GARDNER                2,423,970
                         GEOPHONE POLARITY INDICATOR
                            Filed June 11, 1945
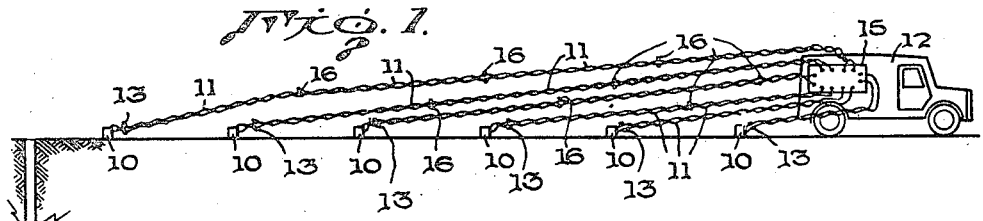
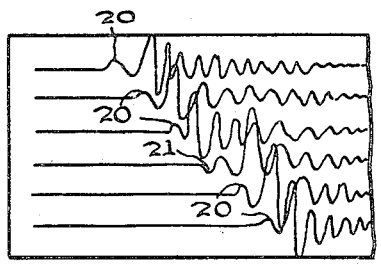
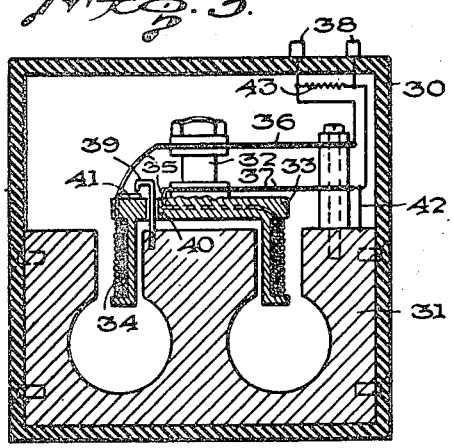
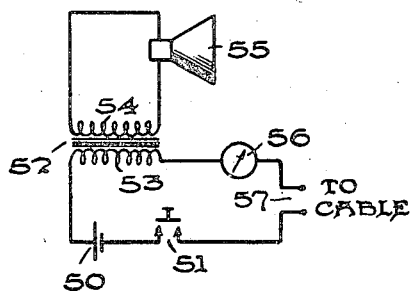
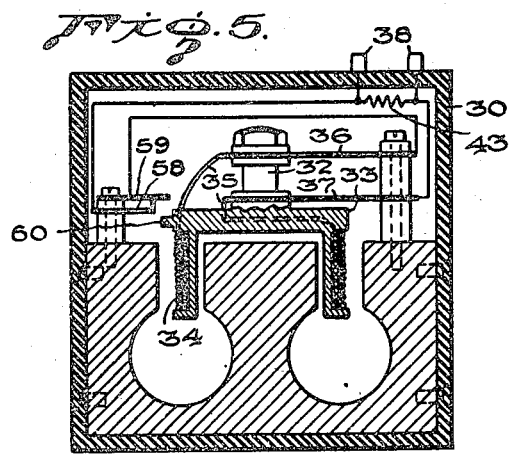
Inventor
LOUIS W. GARDNER Patented July 15, 1947

UNITED STATES PATENT OFFICE 2,423,970

GEOPHONE POLARITY INDICATOR

Louis W. Gardner, Pittsburgh, Pa., assignor to Gulf Research Development Company, Pittsburgh, Pa., a corporation of Delaware Application June 11, 1945, Serial No. 598,692

7 Claims. (Cl. 177—352)

This invention concerns seismograph prospecting apparatus and in particular it comprises means to determine whether a remotely located geophone is properly connected to its associated recording apparatus.

In seismograph prospecting methods it is customary to fire a charge of explosive at or near the surface of the earth and to detect the resulting earth tremors at a number of spaced points. At each of these points there is placed an instrument, termed a geophone, which converts the earth tremors into electrical impulses. These impulses are fed over cables to a central recording station, usually a field truck. Here the respective impulses are amplified in more or less conventional vacuum tube amplifiers and fed to a recording device which also, by conventional means, makes a permanent record of the impulses as received. Usually each geophone location results in one trace on the record.

For a number of reasons it is desirable to place on one record the traces of as many geophone locations as is practical. Depending on the type of operation, it is common practice to use as many as thirty geophone stations with as many cables running to the truck and as many amplifying and recording channels. Geophone stations may be one hundred or more feet apart and are usually in a straight line so that the total spread covered may be a half mile or more. In certain types of operations the spacings may be as much as five hundred feet apart, in which case the end geophones may be even more than a mile from the recording truck. It is apparent that a means for determining from the truck whether a geophone is properly connected and in proper operation is highly desirable.

After the recordings have been made an analysis of the records results in a structural picture of the underlying geological formations. In order to make this analysis various recorded impulses are examined for time of arrival, character, interval and other characteristics of the recorded trace. It is important in making this analysis that one may depend on the fact that all geophones are connected through their respective cables and amplifying channel so that they have on the record a uniform polarity; that is, so that all geophones when experiencing an upward earth impulse produce on the trace a uniformly directed deflection. This is called phasing, and care must be taken to see that the phasing remains the same in all field connections and set-ups of a given project.

Phasing becomes particularly important in a type of operation which is conventionally called refraction seismograph prospecting and in which the initial on-set of the earth tremor is observed. It is customary to look for an on-set to show a deflection in a characteristic direction, i. e., upward or downward on the tape, and obviously a phase reversal of any detector will mislead the interpreter by the time of one-half cycle.

In many cases, on-sets on each trace are not characteristically distinguishable from preceding oscillations, but may be picked in correlating wave forms in oblique alignment across a multiplicity of traces. However, if this alignment is broken by one or more traces being unaccountably in opposite phase to normal, a doubtful or false correlation is obtained across the multiplicity of traces which may much more seriously affect interpretation results. This uncertainty may be overcome by use of shorter spacing of detectors, whereby false phasing can be recognized, but this entails less economical operations.

In this type of operation the detectors are spaced far apart requiring many cable lengths and increasing the possibility of an unintentional phase reversal.

An attempt is made in the field to maintain the phasing by exercising ordinary care in connecting cables or by the use of polarized plugs at the cable ends. These means, however, are not entirely satisfactory for the reason that color indications become faded or obliterated with mud and cable connectors frequently break off and are of no avail unless properly replaced. Breaks in cable may occur and be improperly spliced. The use of color coded cables or connectors also increases the expense of the field operations. Sometimes color coded cables are not available. A phase reversal anywhere in the cable system or in the interconnections between apparatus may prove serious. Connections between apparatus in the truck usually can be maintained, but all connections affecting the phase may be checked by means of my invention.

It is accordingly an object of this invention to provide a means of determining that a seismograph geophone or detector is connected to its recording apparatus with proper polarity.

Another object is to provide apparatus with which one may trace cable connections so as to avoid any possibility of phase inversions.

A further object is to provide means for testing the operation of geophones, thereby permitting the operator to detect improper phasing.

An ancillary object is to provide means with which an operator may determine that the moving element of a geophone is freely suspended and in operating condition.

A still further object is to provide means with which one may check the polarity of connections through any cable sequence.

These objects are accomplished as described in the following specification of which the drawings form a part, and in which:

Figure 1 is a diagrammatical illustration of a field set-up of a number of geophones;

Figure 2 illustrates a typical record obtained;

Figure 3 shows a sectional elevation of an electromagnetic geophone modified according to my invention;

Figure 4 shows a wiring diagram of the indicating device contemplated by my invention; and Figure 5 shows a sectional elevation of another modification of geophone which may be used.

Referring to Figure 1 a number of geophones 10 are set out on the surface of the ground and connected by cable lengths 11 to the truck 12 in which there are a suitable number of recording channels. The connection must be made between the cable and geophone at points 13 and between the cable and recording apparatus panel at panel 15. Furthermore when it is necessary to use long lengths of cable there will be splices indicated at points 16. Unless all these connections are properly made a phase reversal may occur.

Figure 2 shows a typical conventional record. Conventional timing lines and shot moment trace are not indicated. For simplicity only first arrivals are shown as in a refraction shot but a similar problem also exists in reflection shooting. First arrivals on Figure 2 are indicated at points 20 and for purposes of illustration one trace is shown with reversed phase at 21. It is apparent that there may be uncertainty in determining the proper on-set point of this trace because the existence of a phase reversal is not definitely known. By the use of my invention all such ambiguity is avoided. This is done by means of a simple testing device in the recording truck and a minor modification of the geophone itself as described.

In Figure 3 numeral 30 indicates a detector case containing a conventional geophone. I have shown by way of example a suspended coil electrodynamic type geophone having magnet structure 31 and suspended coil assembly 32. Coil assembly 32 consists of an insulating frame 33 upon which is wound a coil of copper wire 34 connected by means of leads 35 through conducting cantilever suspensions 36 and 37 held in an insulating clamp to geophone terminals 38. The coil assembly 32 is delicately suspended by the suspensions 36 and 37, and when an earth impulse causes the case and magnet to move, coil assembly 32 tends to remain at rest, the relative motion between coil and magnet field giving rise to an E. M. F. which is transmitted over the cable and amplified and recorded.

In my invention an auxiliary contact 39 is provided connected to the magnet structure 31. This contact extends through a hole 40 in the coil frame and cooperates with contact 41 connected to one terminal of the coil. Lower suspension 37 is connected by a short lead 42 to magnet 31. The gap between contacts 39 and 41 is made large enough so that it will not interfere with the ordinary operation of the coil. The contact 39 may serve as an upper motion stop to avoid excessive upward motion of the coil in transportation. Conventional damping resistor 43 is connected in parallel across terminals 38.

Referring now to Figure 4, there is placed in the instrument truck a circuit arranged as shown, and comprising battery 50, push button switch 51, transformer 52, whose primary 53 is connected in series with the battery and whose secondary 54 is connected to a loud speaker 55. A meter 56 may be provided in the primary circuit if desired. The terminals 57 of this circuit are connected to the cable terminals at panel 15 (Fig. 1) at the truck and may be connected in a predetermined polarity relation to each cable successively in turn. If the phasing through the various cables to the geophone coil is correct then the effect of the battery current when push button 51 is pressed will be to urge the coil with contact 41 upward against contact 39. Upon closing contacts 39 and 41 the coil will be short-circuited and thereby de-energized, therefore dropping and again separating contacts 39 and 41. This process will repeat itself and give rise to a repeated make and break in the primary circuit of transformer 52. Through the action of the transformer, loud speaker 55 will give a signal identified as a buzz. If, however, the phasing is incorrect current will flow through the coil in the opposite direction and will urge the coil downward until it simply reaches the lower limit of its travel. No make and break will occur and no buzz is heard in the loud speaker. Meter 56 may be observed to check continuity of the circuit and may be used to detect abnormal conditions of line resistance. The operator may thus test in succession each of his geophone circuits and make any necessary corrections before the shot is made, thus avoiding any ambiguity in the interpretation of the ensuing recording. A selector switch may be used to facilitate the successive tests.

Figure 5 shows another modification of the conventional detector which may be used. In this case a small projection 60 on the coil frame strikes a contact spring 59 mounted nearby but not normally in mechanical contact with the coil. A cooperating contact 58, out of the path of projection 60, is disposed so that electrical contact between 58 and 59 is normally closed. Upon energizing the coil with proper polarity by means of the circuit of Figure 4, upward motion of the coil will open the electrical contact between 58 and 59, de-energizing the coil which thereupon drops back and the process repeats itself, thus producing a buzz which is easily recognized by the operator through the agency of loud speaker 55. If through improper phasing, improper polarity is applied to the coil, the coil simply moves downward and does not disturb the contact and no buzz is produced.

I have indicated in Figure 5 an auxiliary contact as open-circuiting the detector coil when the latter is energized so as to strike said contact, but such contact may with equal result be made so as to short-circuit the coil as in Figure 1. Thus, in Figure 5, contacts 58 and 59 may be normally open and connected electrically in parallel with coil 34 so that when disturbed by energization of the coil in one sense the coil will be short-circuited, repetition of this process causing a buzz. In this case projection 60 may be arranged to strike contact spring 58 and push it into contact with 59.

While I have indicated upward motion to disturb the contact, the mechanical arrangement may alternatively be made to operate the contact on downward motion of the suspended system. Furthermore, while I have illustrated the application of my invention to an electrodynamic type of geophone, it may be applied with equal effect to other types of geophones in which polarized motion of the suspended system may be obtained through the application of an externally applied electric current.

As a further means for assuring the existence of proper phasing each line and geophone may be tested with the device of Figure 4 while it is connected to its recording channel. The resulting buzz or lack of buzz indicating the phasing will then affect the amplifier circuit and the effect may be recorded on the tape previous to taking the record, thus supplying unequivocal proof to the interpreter of the record that no phasing error has been made in the field setup by which the record was obtained.

While the primary purpose of my invention is to establish the geophone phasing, an important additional advantage lies in the fact that it may warn the operator of an inoperative geophone. Thus if connecting the device of Figure 4 in either direction fails to elicit a buzz, the operator may conclude that the geophone moving system is stuck or the instrument otherwise damaged. The condition may be corrected before the shot is made.

As a further application of my invention a device similar to the geophone Figure 3 but not necessarily used as such, together with a device of Figure 4, may be used for phasing out a cable sequence in any type of circuit and need not be restricted to those encountered in seismograph operations. The polarity of telephone, telegraph, switchboard and other circuits may be determined by the apparatus of this invention with equal facility.

What I claim as my invention is:

1. In a seismograph recording system comprising an electromagnetic geophone connected to an electric recording channel, said geophone having an elastically suspended moving system capable of being set into motion by an electric current traversing the geophone, the improvement which comprises an auxiliary electrical contact in said geophone circuit normally out of mechanical contact with the moving system and disposed so as to be disturbable by electrically induced motion in only one sense of the moving system of said geophone, means for applying a unidirectional electric current to the channel to which said geophone is connected and means for indicating disturbance of said contact.

2. Seismograph recording channel testing apparatus comprising a geophone and its recording channel, said geophone having an elastically suspended moving system capable of being set into motion by an electric current traversing the geophone, an electrical contact in the geophone circuit normally not touching the moving system of said geophone and disposed so that electrically induced movement of said moving system in only one sense will disturb said contact, means for applying a unidirectional electric current to the channel to which said geophone is connected and means for indicating disturbance of said contact.

3. In a remote recording geophone system comprising an electromagnetic geophone and a cable system electrically connected thereto, said geophone having an elastically suspended moving system capable of being set into motion by an electric current traversing the geophone, the improvement which comprises a pair of auxiliary electrical contacts in the geophone and in said geophone circuit, said contacts being disposed so that their circuit is disturbed by motion of the moving system in only one sense, means for applying a unidirectional electric current to the cable end remote from the geophone and means for indicating at the cable end remote from the geophone disturbances of said electrical contacts.

4. In a seismograph recording channel comprising an electromagnetic geophone connected to an electric recording channel, said geophone having an elastically suspended moving system capable of being set into motion by an electric current traversing the geophone, the improvement which comprises a pair of auxiliary electrical contacts in said geophone circuit, said contacts being disposed so that their circuit is disturbed by motion in only one sense of the moving system of said geophone, means for applying a unidirectional electric current to the channel to which said geophone is connected and means for indicating disturbances of said electrical contacts.

5. In a seismograph recording system comprising an electromagnetic geophone connected to an electric recording channel, said geophone having an elastically suspended moving system capable of being set into motion by an electric current traversing the geophone, the improvement which comprises a pair of auxiliary electrical contacts in said geophone circuit, one of said contacts being normally out of mechanical contact with the moving system of said geophone and disposed so as to be disturbable by electrically induced motion in only one sense of the moving system of said geophone, means for applying a unidirectional electric current to the channel to which said geophone is connected and means for indicating disturbances of said electrical contacts.

6. In an electromechanical recording system comprising a reversible electromechanical transducer and its recording channel, said transducer having an elastically suspended movable system capable of being set into motion by an externally applied electric current, testing apparatus therefor comprising an electrical contact in the transducer circuit normally not touching the moving system thereof, a cooperating electrical contact, said contacts being disposed so that electrically induced movement of said moving system in only one sense will disturb their circuit, means for applying a unidirectional electric current to the channel to which said transducer is connected, and means for indicating disturbances of said contact circuit.

7. An electrical circuit comprising a polarized electromechanical transducer having an inaccessible movable element and electrical connections for carrying its output to an accessible point, said movable element being capable of being set into motion by application of electric current to said connections, means for applying direct current of known polarity to said connections whereby said movable element is deflected in a sense dependent on polarity, contact means associated with the movable element to alter the circuit distinctively upon deflection in a predetermined sense, and indicating means at said accessible point responsive to such alteration of the circuit.

LOUIS W. GARDNER.

REFERENCES CITED

The following references are of record in the file of this patent:

UNITED STATES PATENTS

| Number | Name | Date |
| --- | --- | --- |
| 733,627 | Cox | July 14, 1903 |
| 1,971,899 | Buttolph | Aug. 28, 1934 |
| 2,307,792 | Hoover | Jan. 12, 1943 |
| 2,401,955 | Olsen et al. | June 11, 1946 |